(12) United States Patent
Kupelian

(10) Patent No.: US 6,202,510 B1
(45) Date of Patent: Mar. 20, 2001

(54) TIRE PLUG INSERTION TOOL

(75) Inventor: Jacob Kupelian, Ringgold, LA (US)

(73) Assignee: Charles A. Kupelian, Shreveport, LA (US)

( * ) Notice: Subject to any disclaimer, the term of this patent is extended or adjusted under 35 U.S.C. 154(b) by 0 days.

(21) Appl. No.: 09/437,550

(22) Filed: Nov. 10, 1999

Related U.S. Application Data

(60) Provisional application No. 60/109,322, filed on Nov. 20, 1998.

(51) Int. Cl.[7] ..................................... B29C 73/08
(52) U.S. Cl. ................. 81/15.7; 81/15.5; 81/15.2
(58) Field of Search .................... 81/15.7, 15.5, 81/15.2

(56) References Cited

U.S. PATENT DOCUMENTS

| | | |
|---|---|---|
| 689,121 | 12/1901 | Piquet . |
| 1,758,052 | 5/1930 | Missman . |
| 1,794,997 * | 3/1931 | Warsaw . |
| 2,940,167 | 6/1960 | Boyer ................................ 29/267 |
| 3,545,314 | 12/1970 | Docter ................................ 81/15.7 |
| 3,894,449 * | 7/1975 | Hartley . |
| 4,157,809 | 6/1979 | Haller ............................... 254/131 |
| 4,738,462 | 4/1988 | Adams ............................... 280/40 |
| 5,461,945 * | 10/1995 | Lee . |
| 5,505,433 | 4/1996 | Carmichael ........................ 254/211 |
| 5,609,715 * | 3/1997 | Gallentine . |

* cited by examiner

Primary Examiner—Timothy V. Eley
Assistant Examiner—Willie Berry, Jr.
(74) Attorney, Agent, or Firm—John M. Harrison

(57) ABSTRACT

A tire plug insertion tool for sealing a repair plug in a punctured pneumatic tire on an automobile or vehicle wheel. In a preferred embodiment the tile plug insertion tool is characterized by an elongated handle having a flanged wheel-engaging shaft adjustably and pivotally mounted in a slot in one end of the handle. A carriage sleeve is slidably and adjustably mounted on the handle and a plug insertion shaft having a bifurcated bottom end, extends downwardly from pivotal attachment to the carriage sleeve. After the wheel having the punctured tire is optionally removed from the automobile or vehicle, the flanged bottom end of the vertical wheel-engaging shaft is caused to removably engage the cupped wheel rim or hub, and the handle is extended horizontally over the tire tread. The plug insertion shaft is then located above the puncture opening in the tire tread, by manually sliding the carriage sleeve and suspended plug insertion shaft along the handle and securing the carriage sleeve in place. A resilient, band-shaped repair plug is inserted between the bifurcations of the plug insertion shaft, which is next extended into the puncture opening in the tire casing by pivoting the handle downwardly on the wheel engaging shaft. Upon lifting the plug insertion shaft from the puncture opening by pivoting the handle upwardly, the repair plug becomes detached from the plug insertion shaft, sealing the opening.

11 Claims, 3 Drawing Sheets

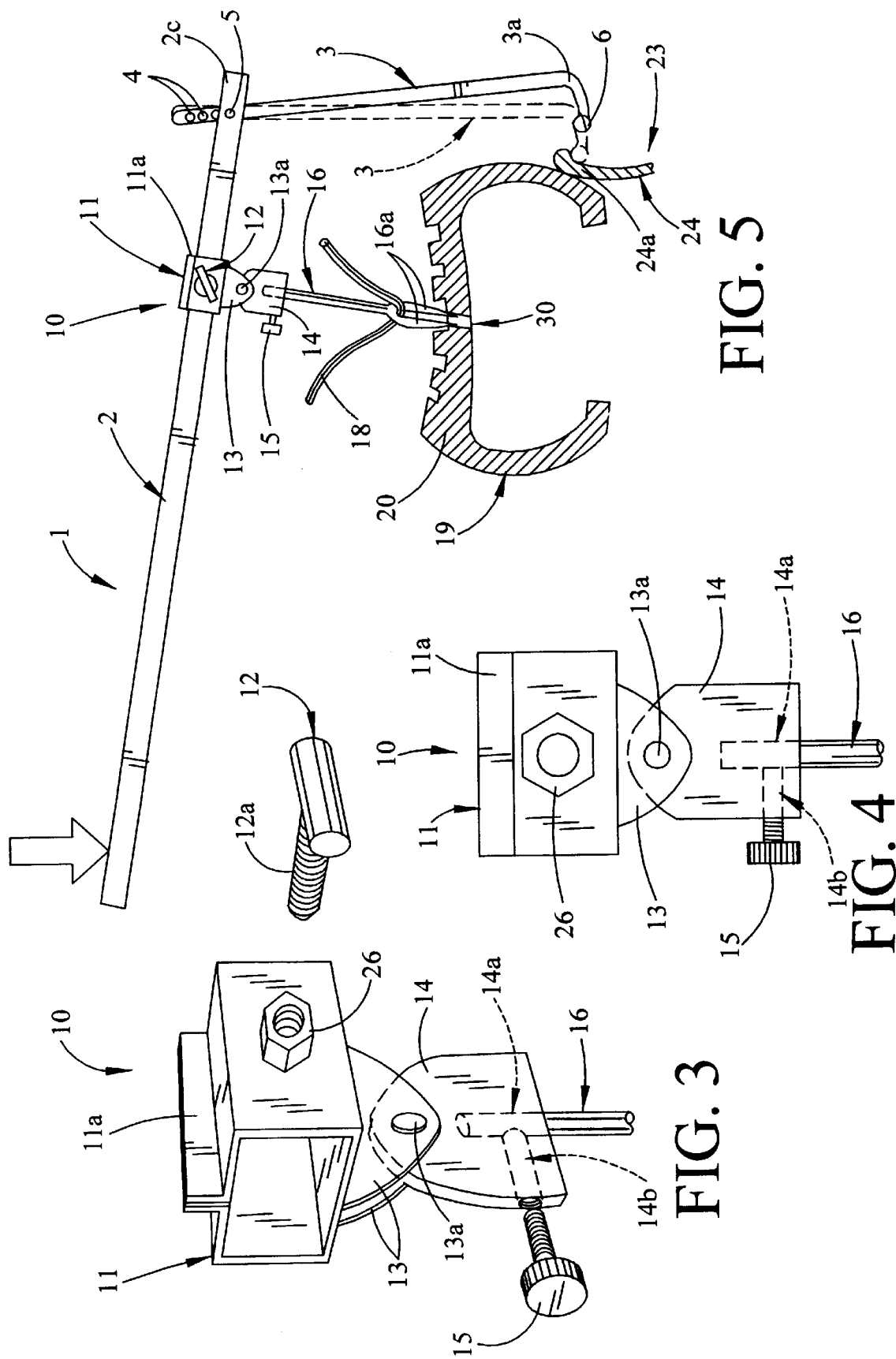

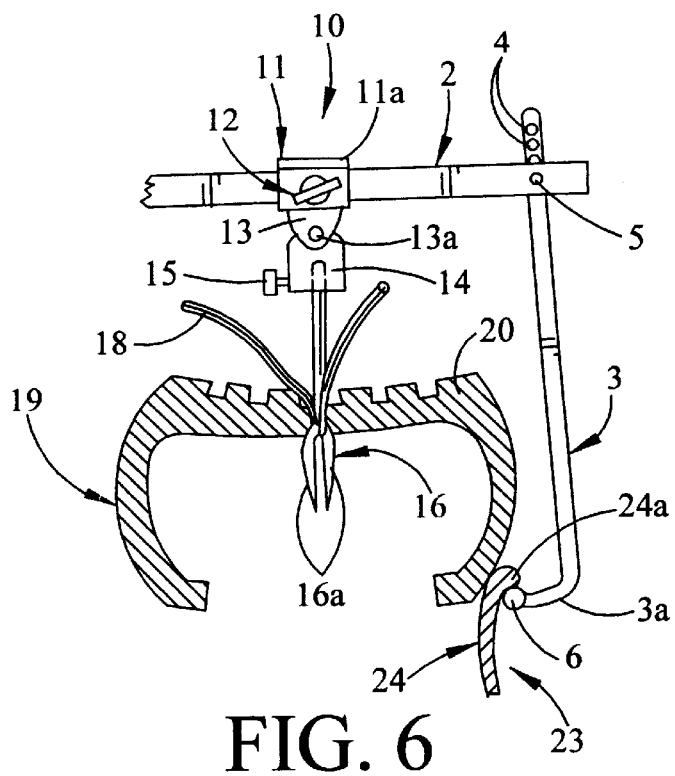
FIG. 6
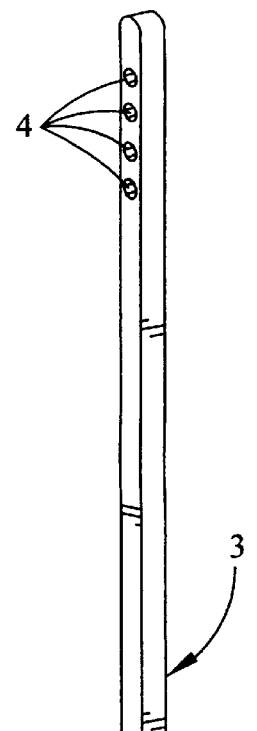
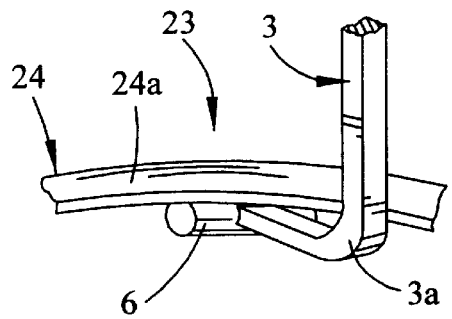
FIG. 7
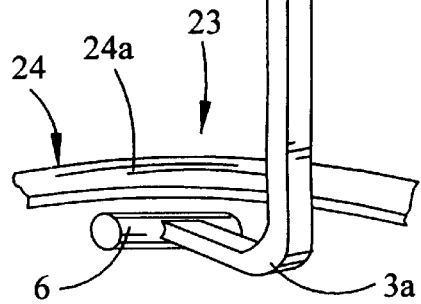
FIG. 8
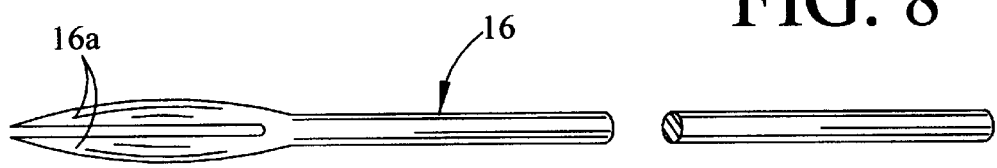
FIG. 9

TIRE PLUG INSERTION TOOL

This application claim benefit to Provisional application Ser. No. 60/109,322, filed Nov. 20, 1998.

BACKGROUND OF THE INVENTION

1. Field of the Invention

This invention relates to devices for sealing puncture openings in pneumatic tires and more particularly, to a tire plug insertion tool for inserting and sealing a band-shaped, resilient repair plug in a punctured pneumatic tire on an automobile or vehicle wheel. In a preferred embodiment the tire plug insertion tool is characterized by an elongated handle having an L-shaped, wheel-engaging shaft adjustably and pivotally mounted in a slot in the end of the handle. The wheel with the mounted punctured tire can be removed from the automobile or vehicle or left in place, and the flanged bottom end of the vertical wheel-engaging shaft is caused to removably engage the cupped rim or hub of the wheel and the handle is extended horizontally over the tread span of the tire. A plug insertion shaft is suspended from pivotal attachment to a carriage sleeve, slidably and adjustably mounted along the handle, to facilitate locating the bifurcated bottom end of the suspended plug insertion shaft above the puncture opening in the tire tread. The repair plug is inserted between the bifurcations of the plug insertion shaft, which is then extended downwardly into the puncture opening by pivoting the handle on the wheel-engaging shaft. Subsequent removal of the plug insertion shaft from the puncture opening by lifting upwardly on the handle, leaves the repair plug sealed in the puncture opening.

2. Description of the Prior Art

Various tools for repairing puncture openings in pneumatic tires are known in the art. U.S. Pat. No. 689,121, dated Dec. 17, 1901, to Benjamin J. Piquet, describes a "Tire Repairing Tool" for repairing punctures in pneumatic tires. The tool is frist used to enlarge a puncture opening in the tire and then to introduce through the enlarged opening, a plug having a double head and a short connecting shank, the shank being adapted to fill the opening and the heads adapted to close in contact with the inner and outer faces of the tire around the opening in an airtight manner. U.S. Pat. No. 2,940,167, dated Jun. 14, 1960, to Ralph K. Boyer, et al, details a "Tire Valve Tool" for inserting a rubber valve stem in the standard valve stem opening of a wheel rim adapted to mount tubeless tires. The tire valve tool is characterized by an elongated handle and an internally-threaded, valve stem attaching member pivotally attached to one end of the handle. One of multiple notches provided in the handle receives the edge of the wheel rim and the rubber valve stem is inserted in the valve stem opening and then threaded into the valve stem attaching member. As the handle is pivoted on the edge of the rim at the notch, the valve stem attaching member pulls and firmly seats the valve stem in the valve stem opening of the rim. The valve stem attaching member is finally unthreaded from the valve stem, leaving the valve stem firmly seated in the valve stem opening. A "Tire Plugger" is disclosed in U.S. Pat. No. 3,545,314, dated Dec. 8, 1970, to Charles J. Docter. The tire plugger is adapted for inserting a puncture repair plug into a tire casing from the exterior of the casing. The tire plugger is characterized by a lever hinged to an elongated, open-ended barrel for advancing and retracting a plunger in the barrel. The shank of the repair plug is inserted in the barrel with the plunger retracted, and the plunger is advanced from the barrel by operation of the lever to seat the plug in the casing.

An object of this invention is to provide a tire plug insertion tool for inserting and sealing a repair plug in a punctured tire which is mounted on or removed from the vehicle.

Another object of this invention is to provide a new and improved tire plug insertion tool for facilitating alignment of a rubber tire repair plug on the tool with a puncture opening in a pneumatic tire, and subsequent insertion and sealing of the plug in the puncture opening.

Still another object of this invention is to provide a tire plug insertion tool for repairing a puncture opening in a pneumatic tire on an automobile or alternative vehicle wheel, which tire plug insertion tool is characterized by an elongated handle; a wheel-engaging shaft pivotally mounted on one end of the handle for removably engaging the cupped rim or hub of the wheel removed from the automobile or vehicle for repair of the punctured tire; and a tire plug carriage slidably and adjustably mounted on the handle for receiving the band-shaped, resilient repair plug, to facilitate alignment of the repair plug with the puncture opening and subsequent insertion of the repair plug into the puncture opening by lever operation of the handle, to seal the opening.

Yet another object of this invention is to provide a tire plug insertion tool characterized by an elongated handle; a flanged, L-shaped, wheel-engaging shaft pivotally and adjustably extended through a slot in one end of the handle for removably engaging the rim or hub of an automobile or vehicle wheel, upon which is mounted a punctured pneumatic tire and which may be removed from the automobile or vehicle for repair of the tire, depending upon the extent of repair necessary; a tire plug carriage sleeve slidably and adjustably mounted along the handle; and a plug insertion shaft having a bifurcated bottom end suspended downwardly from pivotal attachment to the carriage sleeve for alignment of a band-shaped, resilient repair plug inserted between the bifurcations of the plug insertion shaft, with a puncture opening in the tire or tire tread and subsequent insertion of the repair plug into the puncture opening by lever operation of the handle, to seal the puncture opening.

SUMMARY OF THE INVENTION

These and other objects of the invention are provided in a tire plug insertion tool for inserting and sealing, a resilient repair plug in a punctured pneumatic tire on an automobile or vehicle wheel. In a preferred embodiment the tire plug insertion tool is characterized by an elongated handle having a flanged wheel-engaging shaft pivotally and adjustably mounted in a slot provided in one end of the handle, for removably engaging the cupped rim or hub of the wheel either after it is removed from the automobile or vehicle or while it is mounted on the vehicle, for repair of the tire. A tire plug carriage sleeve is slidably and adjustably mounted on the handle and a plug insertion shaft having a bifurcated distal end is suspended downwardly from pivotal attachment to the carriage sleeve. As the flanged bottom end of the vertical wheel engaging shaft is caused to removably engage the hub of the wheel, the handle is extended horizontally over the width of the tire tread. The tire plug carriage sleeve and suspended plug insertion shaft are slidably displaced and then secured on the handle in the appropriate location to facilitate alignment of a band-shaped, resilient repair plug inserted between the bifurcations of the plug insertion shaft, with the puncture opening in the tread or tire wall. Subsequent insertion of the repair plug in and removal of the plug insertion shaft from the opening by lever operation of the handle, facilitates sealing the repair plug in the opening.

BRIEF DESCRIPTION OF THE DRAWINGS

The invention will be better understood by reference to the accompanying drawings, wherein:

FIG. 3 is a perspective view of a carriage sleeve element of the tire plug insertion tool, with a shaft plate and attached plug insertion shaft, partially in section, pivotally attached to the underside of the carriage sleeve;

FIG. 4 is a side view of the carriage sleeve, shaft plate and plug insertion shaft illustrated in FIG. 3;

FIG. 5 is a side view of the tire plug insertion tool, removably engaging the hub or rim of an automobile or vehicle wheel, partially in section, preparatory to inserting a band-shaped, resilient repair plug into a puncture opening in a pneumatic tire fitted on the wheel;

FIG. 6 is a side view, partially in section, of the tire plug insertion tool illustrated in FIG. 5, more particularly illustrating use of the tire plug insertion tool to insert and seal the repair plug in the puncture opening in the pneumatic tire;

FIG. 7 is a perspective view, partially in section, of a wheel-engaging shaft element of the tire plug insertion tool, removably engaging the hub, also in section, of an automobile or vehicle wheel;

FIG. 8 is a perspective view of the wheel-engaging shaft illustrated in FIG. 7, prior to engagement of the wheel-engaging shaft with the hub or rim of the automobile or vehicle wheel; and FIG. 9 is a side view, partially in section, of the plug insertion shaft element of the tire plug insertion tool.

DESCRIPTION OF THE PREFERRED EMBODIMENTS

Figure 1:
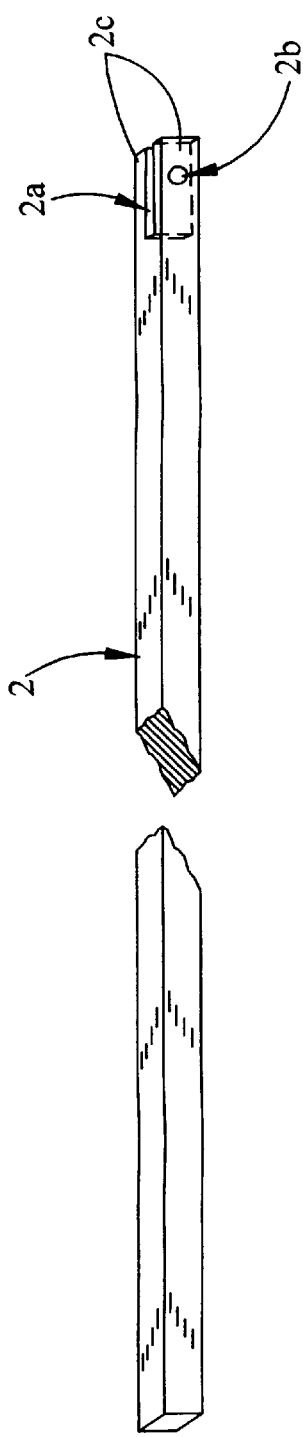
FIG. 1 is a perspective view of a handle element, in section, of a preferred embodiment of the tire plug insertion tool of this invention.
Figure 2:
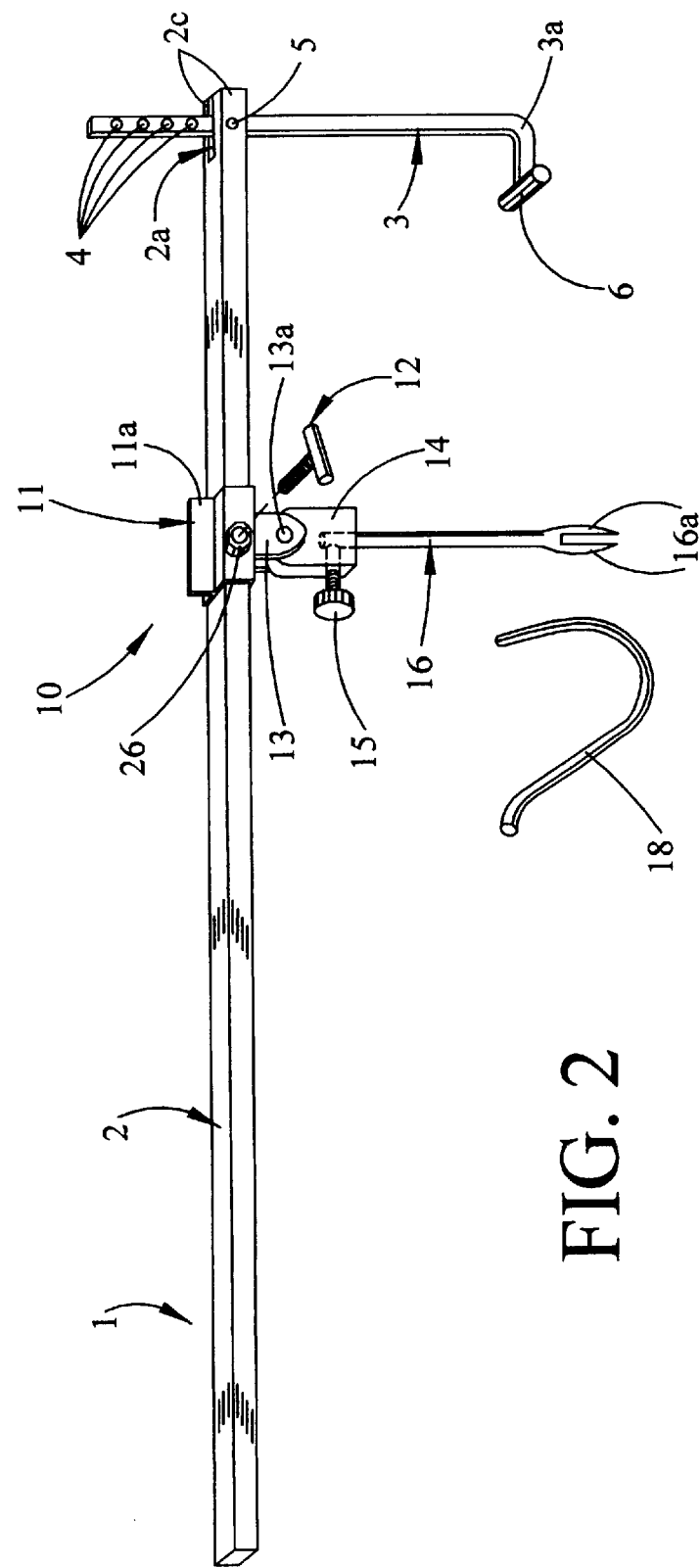
FIG. 2 is a perspective view of a preferred embodiment of the tire plug insertion tool.

Referring initially to FIGS. 1, 2 and 5–8 of the drawings, in a preferred embodiment the tire plug insertion tool of this invention is generally illustrated by reference numeral 1. The tire plug insertion tool 1 is characterized by an elongated handle 2, having an elongated shaft slot 2a shaped in one end thereof and defining a pair of parallel, spaced-apart shalt mount flanges 2c, as illustrated in FIGS. 1 and 2. An L-shaped wheel-engaging shaft 3, provided with multiple, spaced-apart adjustment openings 4 adjacent to one end, includes a shaft bend 3a, shaped adjacent to the other end thereof, as illustrated in FIG. 2. The wheel-engaging shaft 3 is removably fitted in the shalt slot 2a and pivotally mounted between the shaft mount flanges 2c, by means of an adjustment pin 5, which is extended through a pair of registering pin openings 2b, provided in the respective shaft mount flanges 2c, and a selected, aligned adjustment opening 4 in the wheel engaging shaft 3. A hub-engaging flange 6 is provided on the extending bottom end of the wheel-engaging shaft 3 adjacent to the shaft bend 3a, for removably engaging the hub lip 24a on the wheel rim or hub 24 of an automobile or vehicle wheel 23, as illustrated in FIGS. 5–8 and hereinafter further described, which wheel 23 may have been removed from the automobile or vehicle (not illustrated) or maintained in mounted configuration on the vehicle, for repair of a punctured pneumatic tire 19 normally mounted on the wheel 23.

Referring now to FIGS. 3, 4 and 9, and again to FIGS. 2 and 5–8 of the drawings, a tire plug carriage 10 includes a carriage sleeve 11, slidably and adjustably mounted on the handle 2, as illustrated in FIG. 2, and typically shaped with a top carriage flange 11a, as further illustrated in FIG. 3. A T-shaped sleeve adjustment knob 12 includes a threaded shaft 12a which is threaded into a sleeve nut 26 welded or otherwise provided on the side of the carriage sleeve 11. The sleeve adjustment knob 12 is manipulated such that the shaft 12a is tightened against the handle 2 to seat the carriage sleeve 11 at a selected location along the handle 2, according to the location of the puncture opening 30 along the width of the tire tread 20 of the tire 19 (FIG. 5). A pair of sleeve flanges 13 is provided on the underside of the carriage sleeve 11 and a shaft plate 14 is pivotally suspended from between the sleeve flanges 13 by means of a pivot pin 13a. A plug insertion shaft 16 is suspended from the shaft plate 14 by vertical adjustment in a shaft receptacle 14a (illustrated in phantom in FIG. 3) by selectively loosening and tightening a threaded shaft adjustment knob 15 against the plug insertion shaft 16, through a threaded plate opening 14b, also provided in the shaft plate 14. As illustrated in FIGS. 2 and 9, the bottom or distal end of the plug insertion shaft 16 is terminated by a pair of bifurcation prongs 16a, between which a typically rubber band-type tire repair plug 18 is inserted prior to insertion and sealing of the repair plug 18 in the puncture opening 30 of the tire casing 20, by lever action of the handle 2 on the wheel engaging shaft 3, as hereinafter further described.

Referring again to FIGS. 5–8 of the drawings, in application of the tire plug insertion tool 1, the wheel 23 on which the punctured pneumatic tire 19 to be repaired is mounted, is frist either removed from the automobile or vehicle (not illustrated), or maintained in mounted configuration, depending upon the extent and nature of the tire damage. The handle 2 is pivotally attached to the wheel-engaging shaft 3 by fitting the wheel-engaging shaft 3 in the shaft slot 2a between the parallel shaft mount flanges 2c on the handle 2, and then extending the pivot pin 5 through the pin openings 2b in the shaft mount flanges 2c (FIG. 1) and a selected, aligned adjustment opening 4 in the wheel-engaging shaft 3, as heretofore described. The resilient typically rubber band-shaped tire repair plug 18 is then inserted between the bifurcation prongs 16a of the plug insertion shaft 16 on the tire plug carriage 10. The typically cylindrical hubengaging flange 6 of the vertical wheel-engaging shaft 3 is next caused to engage the cupped inner surface of the hub lip 24a of the wheel rim or hub 24 on the removed wheel 23, as illustrated in FIGS. 7 and 8, and the pivoting handle 2 is extended over the width of the tire tread 20, as further illustrated in FIGS. 5 and 6. The carriage sleeve 11 of the tire plug carriage 10 is then slidably adjusted on the handle 2 such that the bifurcation prongs 16a of the plug insertion shaft 16 are suspended directly above the puncture opening 30 in the tire tread 20, as illustrated in FIG. 5. The carriage sleeve 11 is then secured on the handle 2 by tightening the sleeve adjustment knob 12 in the sleeve nut 26 against the handle 2. Fine adjustment of the distance between the tire plug 18 in the bifurcation prongs 16a and the puncture opening 30 can be effected by loosening the shaft adjustment knob 15 in the plate opening 14b of the shaft plate 14 (FIG. 4), extending or retracting the plug insertion shaft 16 in the shaft receptacle 14a and then tightening the shaft adjustment knob 15 against the plug insertion shaft 16. The tire plug 18, retained between the bifurcation prongs 16a of the plug insertion shaft 16, is next inserted completely into the puncture opening 30 of the tire casing 20, by pivoting the handle 2 downwardly in lever fashion at the adjustment pin 5 on the wheel-engaging shaft 3, as illustrated in FIGS. 5 and 6 to extend the bifurcation prongs 16a into the puncture. The handle 2 is then pivoted upwardly to lift the plug insertion shaft 16 and the bifurcation prongs 16a from the puncture opening 30, leaving the resilient tire plug 18 sealed in the puncture opening 30. The hub attachment flange 6 on the wheel-engaging shaft 3 is finally removed from the hub lip 24a of the wheel rim or hub 24, after which the wheel 23 is replaced on the automobile or vehicle (not illustrated).

It will be appreciated by those skilled in the art that the adjustable feature of the tire plug carriage 10 along the handle 2 over the entire width of the tire casing 20, facilitates repair of a puncture opening 30 located in any location along the width of the tire tread 20, as well as the tire wall. Furthermore, the pivoting feature of the plug insertion shaft 16 on the carriage sleeve 11 facilitates extension of the tire plug 18 into a puncture opening 30 disposed at an angle with respect to the tread surface of the tire tread 20.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A tire plug insertion tool for inserting a repair plug in a puncture opening in a tire mounted on a rim or hub, said tire plug insertion tool comprising a handle; a wheel-engaging shaft carried by one end of said handle for removably engaging the hub, said handle adapted for extension over the width of the tire; and a plug insertion mechanism carried by said handle for inserting and sealing the plug in the puncture opening.

2. The tire plug insertion tool of claim 1 wherein said plug insertion mechanism comprises a carriage sleeve slidably mounted on said handle and a plug insertion shaft carried by said carriage sleeve for engaging the plug and inserting the plug in the puncture opening.

3. The tire plug insertion tool of claim 1 wherein said engaging mechanism is mounted for vertical adjustment on said handle.

4. The tire plug insertion tool of claim 3 wherein said plug insertion mechanism comprises a carriage sleeve slidably mounted on said handle and a plug insertion shaft carried by said carriage sleeve for engaging the plug and inserting the plug in the puncture opening.

5. A tire plug insertion tool for inserting and sealing a repair plug in a puncture opening in a pneumatic tire on a vehicle wheel having a hub, said tire plug insertion tool comprising an elongated handle; a wheel-engaging mechanism pivotally carried by one end of said handle for removably engaging the hub on the vehicle wheel, said handle adapted for extension over the width of the tire; a carriage sleeve slidably and adjustably mounted on said handle; and a plug insertion shaft carried by said carriage sleeve for receiving the plug and inserting and sealing the plug in the puncture opening responsive to pivoting of said handle on said wheel-engaging mechanism.

6. The tire plug insertion tool of claim 5 wherein said wheel-engaging mechanism comprises a wheel-engaging shaft pivotally carried by one end of said handle.

7. The tire plug insertion tool of claim 5 comprising a bifurcation provided in said plug insertion shaft for removably retaining said plug.

8. The tire plug insertion tool of claim 5 comprising a bifurcation provided in said plug insertion shaft for removably retaining said plug and wherein said wheel-engaging mechanism comprises a wheel-engaging shaft pivotally carried by one end of said handle.

9. A tire plug insertion tool for inserting and sealing a resilient repair plug in a puncture opening in a pneumatic tire mounted on a vehicle wheel hub, said tire plug insertion tool comprising an elongated handle; a wheel-engaging shaft adjustably and pivotally carried by one end of said handle for removably engaging the wheel hub, said handle adapted for extension over the width of the tire; a carriage sleeve slidably and adjustably mounted on said handle; a shaft plate pivotally carried by said carriage sleeve; a plug insertion shaft adjustably carried by said shaft plate; and a bifurcation formed in said plug insertion shaft for receiving the resilient repair plug and inserting and scaling the plug in the puncture opening, responsive to pivoting said handle on said wheel-engaging shaft.

10. A tire plug insertion tool for inserting a repair plug in a puncture opening in a tire mounted on a rim or hub, said tire insertion tool comprising a handle; an engaging mechanism carried by said handle for engaging the hub, said handle adapted for extension over the width of the tire, a carriage sleeve slidably mounted on said handle; and a plug insertion shaft carried by said carriage sleeve for engaging the plug and inserting the plug in the puncture opening.

11. The tire plug insertion tool of claim 10 wherein said engaging mechanism is mounted for vertical adjustment on said handle.

* * * * *